(12) United States Patent
Tamura

(10) Patent No.: US 7,725,136 B2
(45) Date of Patent: May 25, 2010

(54) INFORMATION PROCESSING APPARATUS

(75) Inventor: Toshiya Tamura, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 834 days.

(21) Appl. No.: 11/470,430

(22) Filed: Sep. 6, 2006

(65) Prior Publication Data

US 2008/0032752 A1 Feb. 7, 2008

(30) Foreign Application Priority Data

Jul. 21, 2006 (JP) .............................. 2006-199672

(51) Int. Cl.
H04M 1/00 (2006.01)
(52) U.S. Cl. .............. 455/569.1; 455/575.1; 455/575.2; 455/550.1; 455/73; 455/90.3; 455/414.4; 455/420; 455/221; 455/567
(58) Field of Classification Search .............. 455/569.1, 455/575.2, 550.1, 575.1, 73, 90.3, 414.4, 455/420, 221, 567
See application file for complete search history.

(56) References Cited

U.S. PATENT DOCUMENTS

| 6,891,854 B2 * | 5/2005 | Zhang et al. ................. 370/468 |
| 7,072,366 B2 * | 7/2006 | Parkkinen et al. ........... 370/538 |
| 7,359,671 B2 * | 4/2008 | Richenstein et al. ....... 455/3.06 |
| 7,436,454 B2 * | 10/2008 | Yamaguchi et al. ...... 348/387.1 |
| 2003/0079222 A1 * | 4/2003 | Boykin et al. ................. 725/31 |
| 2004/0114576 A1 * | 6/2004 | Itoh et al. ................... 370/352 |
| 2004/0160971 A1 * | 8/2004 | Krause et al. ............... 370/412 |
| 2005/0172028 A1 * | 8/2005 | Nilsson et al. .............. 709/231 |
| 2006/0041431 A1 * | 2/2006 | Maes ....................... 704/270.1 |
| 2006/0116073 A1 * | 6/2006 | Richenstein et al. ........ 455/3.06 |
| 2006/0200259 A1 * | 9/2006 | Hoffberg et al. .............. 700/86 |
| 2006/0205449 A1 * | 9/2006 | Hillyard .................. 455/575.2 |
| 2006/0217061 A1 * | 9/2006 | Steele et al. ................ 455/3.06 |
| 2006/0271989 A1 * | 11/2006 | Glaser et al. ................. 725/111 |
| 2006/0287745 A1 * | 12/2006 | Richenstein et al. .......... 700/94 |
| 2007/0242834 A1 * | 10/2007 | Coutinho et al. ........... 381/71.8 |
| 2008/0032752 A1 * | 2/2008 | Tamura .................... 455/569.1 |
| 2008/0287063 A1 * | 11/2008 | Kidron et al. ............... 455/41.2 |
| 2008/0312915 A1 * | 12/2008 | Den Brinker et al. ....... 704/219 |
| 2008/0318518 A1 * | 12/2008 | Coutinho et al. ........... 455/3.06 |

FOREIGN PATENT DOCUMENTS

| JP | 2002-319925 | 10/2002 |
| JP | 2003-069472 | 3/2003 |
| JP | 2006-020130 | 1/2006 |
| JP | 2006-166128 | 6/2006 |

* cited by examiner

*Primary Examiner*—Duc Nguyen
*Assistant Examiner*—Amar Daglawi
(74) *Attorney, Agent, or Firm*—Oblon, Spivak, McClelland, Maier & Neustadt, L.L.P.

(57) ABSTRACT

In a cellular phone applicable as an information processing apparatus of the invention, an audio data transfer control unit controls streaming transfer of encoded audio data to a headset through wireless communication, and a hands-free control unit controls hands-free communication with the headset through wireless communication. Furthermore, a transmitting/receiving unit transmits/receives data to/from the headset in the streaming transfer of the encoded audio to the headset through the wireless communication or in control over hands-free communication with the headset through wireless communication, and a retransmission control unit controls the retransmission of the data to be transmitted to the headset through the transmitting/receiving processing unit.

13 Claims, 12 Drawing Sheets

INFORMATION PROCESSING APPARATUS

CROSS REFERENCE TO RELATED APPLICATION

This application is based upon and claims the benefit of priority from prior Japanese Patent Application No. 2006-199672 filed on Jul. 21, 2006, the entire contents of which are incorporated herein by reference.

BACKGROUND OF THE INVENTION

1. Field of The Invention

The present invention relates to an information processing apparatus and, in particular, to an information processing apparatus allowing not only the streaming transfer of audio data in realtime but also the call control in calling mode.

2. Description of The Related Art

Recently, a wireless communication technology especially among various communication technologies is being in the limelight. With the wireless communication technology, the establishment of communication between and/or among electronic equipment and terminals in a wireless manner can simplify connection works between and/or among the electronic equipment and terminals and eliminate the limitation of the places where the electronic equipment and terminals are to be placed. Therefore, the use of a wireless communication technology provides higher convenience than the use of a wired communication technology.

For example, the use of a wireless LAN allows the easy construction of a network such as a home network locally and even in a place where the construction of a network cable is not realistic.

The Bluetooth(™), for example, has been known as a wireless communication technology applicable to electronic equipment. The use of the Bluetooth as a wireless communication technology may allow the transmission of audio data (music data) from an audio player containing a CD player to a speaker, for example, without via an audio cable.

Furthermore, the transfer of audio data from a mobile information terminal or mobile music player of a cellular phone, for example, to a music player such as a headset may be allowed thereby without via an audio cable.

The technical specifications of the Bluetooth may be divided into Core and Profile. The Core defines the base of wireless connection provided by the Bluetooth. On the other hand, the Profile is a set of technical requirements defined for each function or equipment for guaranteeing the mutual connectivity between equipment when functions and (or) applications developed based on the Core of the Bluetooth are (is) built in the equipment.

The Bluetooth has multiple Profiles and provides one application including a combination of the Profiles. In reality, a combination of profiles providing an application may be implemented in a product along with the Core.

Various Bluetooth Profiles may be assumed such as profiles relating to a cellular phone, a personal computer, a vehicle, a network and a printer and audio and video Profiles.

As a profile for the transmission of audio data, "Advanced Audio Distribution Profile" (Advanced Audio/Video Distribution Profile (Bluetooth SIG), Internet URL: [http://www-.bluetooth.org/bluetooth/]) and "Generic Advanced Audio/Video Distribution Profile" (Generic Advanced Audio/Video Distribution Profile (Bluetooth SIG), Internet URL: [http://www.bluetooth.org/bluetooth/]) have been known, for example. These are specifications for performing the streaming transfer of audio data in realtime between/among Bluetooth-connected equipment.

On the other hand, as a profile for the call control in calling mode, "Hands Free Profile" (Hands Free Profile (Bluetooth SIG), Internet URL: [http://www.bluetooth.org/bluetooth/]) has been known, for example. This is the specification for performing call control processing (including a series of steps of connection request, call, response, talk and disconnection) in calling mode by a phone between a cellular phone and a terminal (such as a headset) compliant with wireless communication so as to allow hands-free talking from the terminal.

However, the profiles proposed in Non-Patent Documents 1 to 3 do not clearly define the connection operations between both sides though the profiles separately define each of the realtime streaming transfer of audio data and call control in calling mode, for example.

In other words, the retransmission of a packet having failed in communication is recommended with an acceptable realtime level on the playback (playing) side since the real time characteristic on the playback side such as a terminal is required in the procedure of retransmission in the streaming transfer of audio data in real time, which is defined by the profile for transmission of audio data. On the other hand, the retransmission of packet having failed in communication until the communication succeeds is recommended since the realtime characteristic in a terminal is not required very much, but no data (or packet) dropping is required conversely in the procedure of retransmission in the call control in calling mode, which is defined by the profile for call control in calling mode.

Furthermore, the procedure for retransmission cannot be implemented in accordance with each profile since the procedure for retransmission defined by one profile is required to adopt in an operation with the connection between the two profiles for audio data transmission and the profile for call control in calling mode.

SUMMARY OF THE INVENTION

Accordingly, the present invention was conceived in consideration of the circumstances mentioned above, and it is an object of the present invention to provide an information processing apparatus which can perform the retransmission procedure suitable for each profile in an operation in connection between/among multiple profiles.

According to an aspect of the present invention, in order to achieve the above object, there is provided an information processing apparatus including a transfer control unit configured to control streaming transfer of encoded audio data to a terminal through wireless communication, a hands-free control unit configured to control hands-free communication with the terminal through wireless communication, a transmitting/receiving unit configured to transmit/receive data to/from the terminal in the streaming transfer of the encoded audio transfer to the terminal through the wireless communication by the transfer control unit or in control over the hands-free communication with the terminal through the wireless communication by the hands-free control unit, and retransmission control unit configured to control retransmission of data to be transferred to the terminal by the transmitting/receiving unit.

According to the information processing apparatus according to the aspect of the present invention mentioned above, the streaming transfer of encoded audio data to the terminal through the wireless communication is controlled, and the hands-free control is performed over communication with the terminal through the wireless communication. Furthermore, the data is received/transmitted to/from the terminal in the streaming the transfer of encoded audio data to the terminal through the wireless communication or in the hands-free control over the communication with the terminal through the wireless communication, and the retransmission of data to be transferred to the terminal by the transmitting/receiving unit is controlled.

In addition, according to the invention, the retransmission procedure suitable for each profile can be performed in an operation with connection between and/or among the multiple profiles.

The nature and further characteristic features will be made clearer from the following descriptions made with reference to the accompanying drawings.

DESCRIPTION OF THE PREFERRED EMBODIMENTS

Preferred embodiments of the present invention will be described hereunder with reference to the accompanying drawings.

Figure 1:
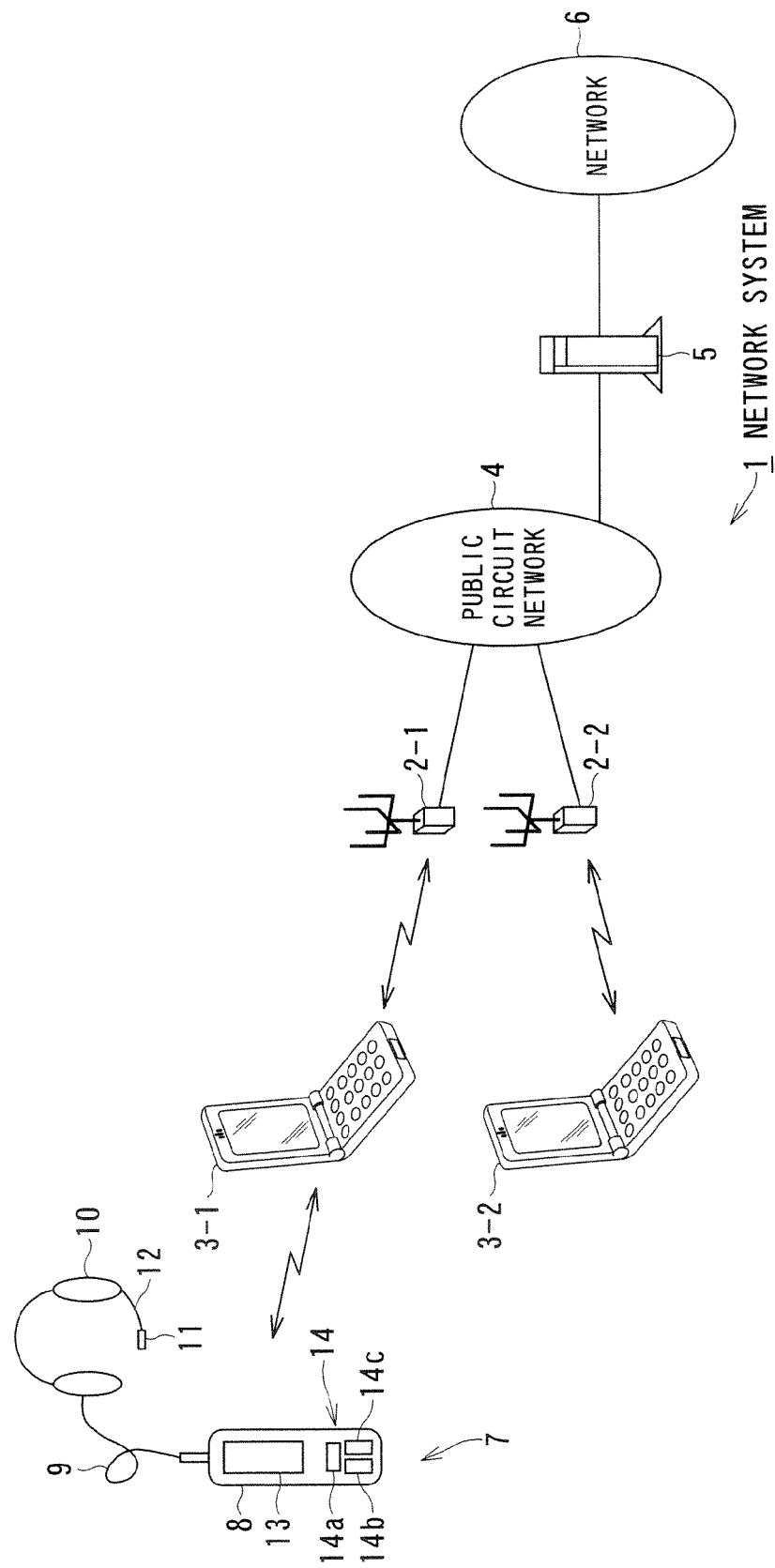
FIG. 1 is a system diagram showing a schematic configuration of a network system according to the present invention.

FIG. 1 shows an entire construction of a network system 1 according to the invention.

The network system 1 includes base stations 2-1 and 2-2, each of which is a fixed radio station within a cell resulting from a division of a communication service available area in a desired size. Cellular phones 3-1 and 3-2, each of which is applicable as an information processing apparatus according to the present invention, are connected to the base stations 2-1 and 2-2 by radio based on a code division multiple access scheme called W-CDMA, for example, whereby a large amount of data can be communicated fast at a data transfer speed of 2 Mbps at the maximum by using a frequency band of 2 GHz, for example.

The fast communication of a large amount of data based on W-CDMA scheme by the cellular phones 3-1 to 3-2 allows variety of data communication including not only voice call but also exchange of electronic mails, viewing of simple web sites and exchange of images and further allows the streaming transfer of audio data in realtime and call control in calling mode by using wireless communication.

A headset 7, which is applicable as a terminal according to the present invention, is provided in the vicinity of the cellular phones 3-1 and 3-2. The headset 7 may receive audio data transferred from the cellular phone 3 by wireless communication, plays it in realtime and/or talk with the cellular phone 3-2 with hands free through the cellular phone 3-1 and the base stations 2-1 and 2-2.

The headset 7 includes a body 8 and a headphone 10 connecting with the body 8 via a cable 9. The body 8 includes a display portion 13 for displaying the name of a tune to be played or a called number and an input portion 14 (including operation buttons 14a to 14c) to be manipulated by a user. The headphone 10 has a microphone 11 to be used for talking at the end of a movable arm 12 so as to receive voice from a user efficiently and selectively.

Each of the cellular phones 3-1 and 3-2 is generally called cellular phone 3 if the distinction between them is not necessary.

Figure 2:
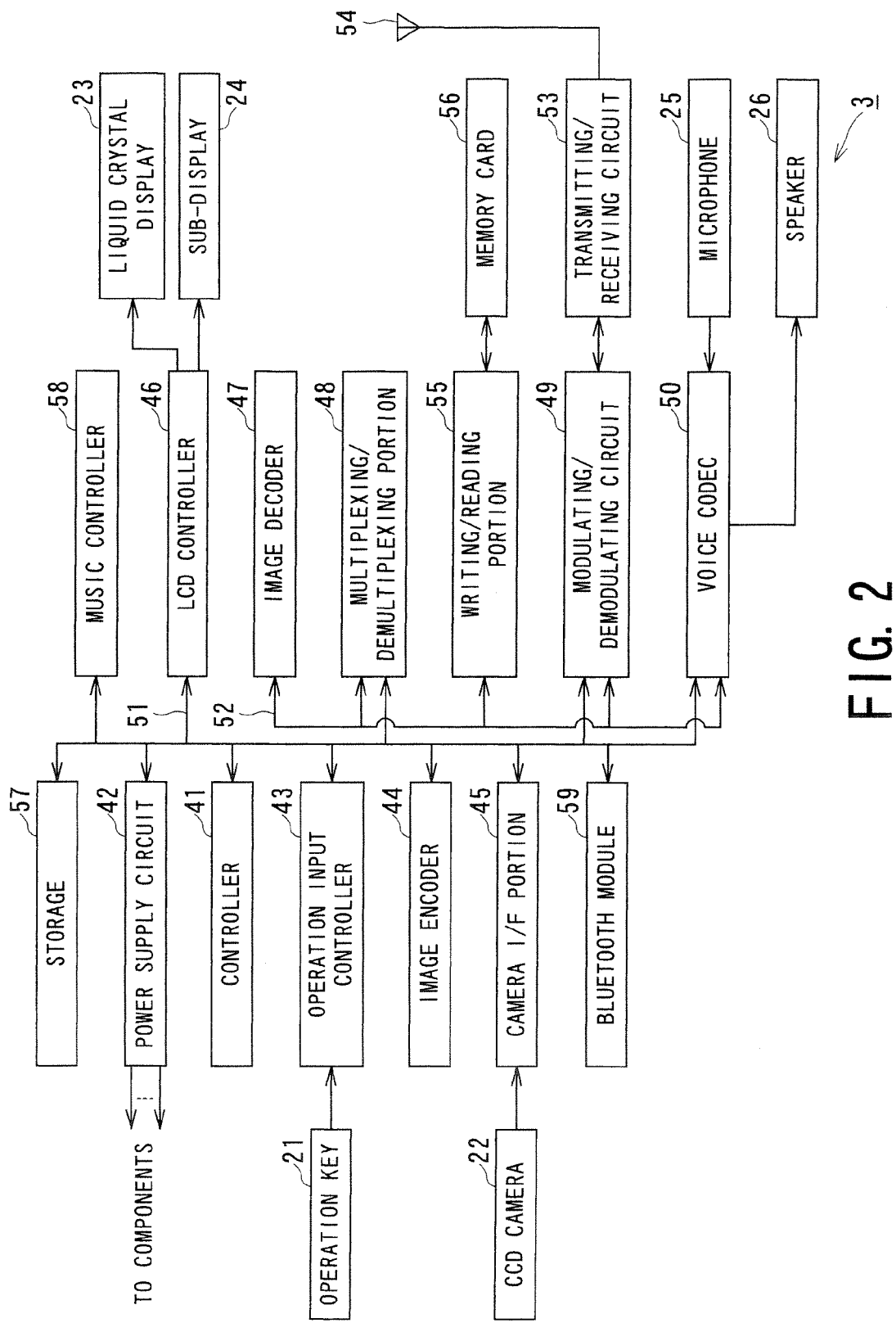
FIG. 2 is a block diagram showing the internal construction of a cellular phone applicable as an information processing apparatus according to the invention.

FIG. 2 is an internal construction of the cellular phone 3 applicable as an information processing apparatus of the present invention.

In the cellular phone 3, as shown in FIG. 2, a controller 41 centrally controlling the components of the cellular phone 3 is connected to a power supply circuit 42, an operation input controller 4, an image encoder 44, a camera interface portion 45, an LCD controller 46, a multiplexing/demultiplexing portion 48, a modulating/demodulating circuit 49, a voice codec 50, a storage 57, a music controller 58 and a Bluetooth module 59 through a main bus 51 and to an image encoder 44, an image decoder 47, a multiplexing/demultiplexing portion 48, a modulating/demodulating circuit 49, a voice codec 50 and writing/reading portion 55 through a synchronous bus 52.

The power supply circuit 42 starts the cellular phone 3 into the operable state by supplying power from the battery pack to the components when the hang-up/power key is turned on in response to an operation by a user.

The controller 41 includes a CPU, a ROM and a RAM. The CPU performs processing in accordance with a program stored in the ROM or an application program loaded from the storage 57 to the RAM, generates and outputs a control signal to a component in order to centrally control the cellular phone 3. The RAM stores data required by the CPU for performing processing.

The controller 41 internally contains a timer for measuring the current date and time.

Here, the application program to be executed by the CPU can be installed in the ROM or storage 57 in advance. An application program to be executed by the CPU may be installed in the storage 57 by downloading it to the cellular phone 3 by the communication through the base station 2. The application program to be executed by the CPU can be further recorded in the memory card 56, read out by the writing/reading portion 55 and installed in the storage 57.

The image encoder 44 converts the image signal supplied from a CCD camera 22 to an encoded image signal by compressing and encoding the image signal by a predetermined encoding scheme such as MPEG4 and transmits the converted encoded image signal to the multiplexing/demultiplexing portion 48. At the same time, the cellular phone 3 transmits the voice gathered by a microphone 25 during shooting by the CCD camera 22 to the multiplexing/demultiplexing portion 48 through the voice codec 50 as digital voice signals.

The multiplexing/demultiplexing portion 48 multiplexes the encoded image signal supplied from the image encoder 44 and the voice signal supplied from the voice codec 50 by a predetermined scheme, performs spectrum spread processing on the resulting multiplexed signal in the modulating/demodulating circuit 49, performs digital/analog converting processing and frequency converting processing thereon in the transmitting/receiving circuit 53 and transmits the result through the antenna 54.

The multiplexing/demultiplexing portion 48 demultiplexes the multiplexed signal into an encoded image signal and voice signal and supplies the encoded image signal to the image decoder 47 and voice signal to the voice codec 50 through the synchronous bus 52. The image decoder 47 decodes the encoded image signal by a decoding scheme corresponding to a predetermined encoding scheme such as MPEG4 to generate a reproduced moving picture signal, and supplies the generated reproduced moving picture image to the liquid crystal display 23 through the LCD controller 46. Thus, the moving picture data included in the moving picture file linked to a Web page, for example, is displayed thereon.

At the same time, the voice codec 50 converts the voice signal to an analog voice signal and then supplies it to a speaker 26. Thus, the voice signal included in the moving image file linked to a Web page, for example, is reproduced. Like the electronic mail case, the cellular phone 3 can record the data linked to a received Web page, for example, in a memory card 56 through the writing/reading portion 55 in response to an operation by a user.

The storage 57 includes a flash memory element, which is an electrically overwritable and erasable non-volatile memory, and stores application programs and data pieces to be executed by the CPU of the controller 41. The storage 57 stores, as required, an electronic mail received in response to an operation by a user, moving picture data included in a moving picture file linked to a received Web page, or audio data obtained over a network 6 (such as the Internet, a LAN, a WAN and other networks).

The music controller 58 may control the execution of a playback operation, a temporary-stop operation, a rewind operation, a forward operation, a sound-level decreasing operation, a sound-level increasing operation and the like on audio data stored in the storage 57.

The Bluetooth module 59 is a module for performing wireless communication by the Bluetooth (registered trademark) and may perform wireless communication with the headset 7 in the vicinity of the cellular phone 3.

Figure 3:
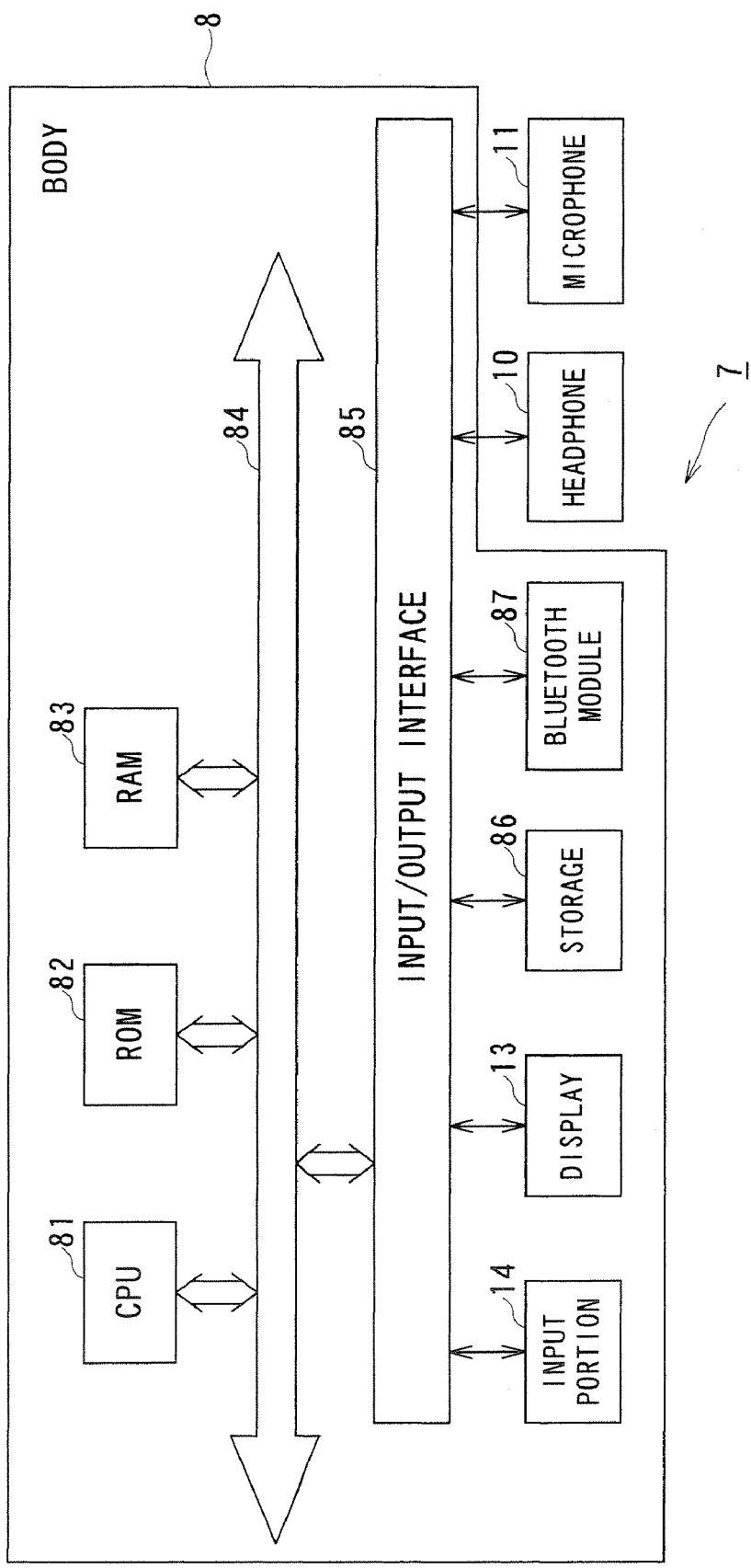
FIG. 3 is a block diagram showing the internal construction of a headset applicable as a terminal according to the invention.

FIG. 3 shows a detail internal construction of the headset 7, which is applicable as a terminal of the present invention. The same reference numerals are given to the components corresponding to those in the headset 7 in FIG. 1, and the repetitive description will be omitted herein.

In the body 8 of the headset 7, as shown in FIG. 3, the CPU 81 performs processing in the cellular phone 3, which serves as a playback (or playing) apparatus, in accordance with a program stored in the ROM 82 or in accordance with a program loaded from the storage 86 to the RAM 83.

The RAM 83 also stores data required for performing processing by the CPU 81.

The CPU 81, ROM 82 and RAM 83 are connected to each other via a bus 84, which is connected to an input/output interface 85.

The input/output interface 85 is connected to the input portion 14 including the multiple operation buttons 14a to 14c, a display portion 13 including an LCD, a storage 86 including a non-volatile memory such as an EEPROM, and a Bluetooth module 87 performing the wireless communication with the cellular phone 3. The input/output interface 85 is also connected to the headphone 10 that outputs voice and the microphone 11 usable for talking.

The Bluetooth module 87 performs the wireless communication processing with the cellular phone 3 in the vicinity of the headset 7. The detail internal construction of the Bluetooth module 87 is basically the same as that of the Bluetooth module 59 in FIG. 4, and the repeated description will be omitted herein.

Embodiments of the cellular phone 3 applicable as the information processing apparatus of the present invention will be described hereunder.

First Embodiment

Figure 4:
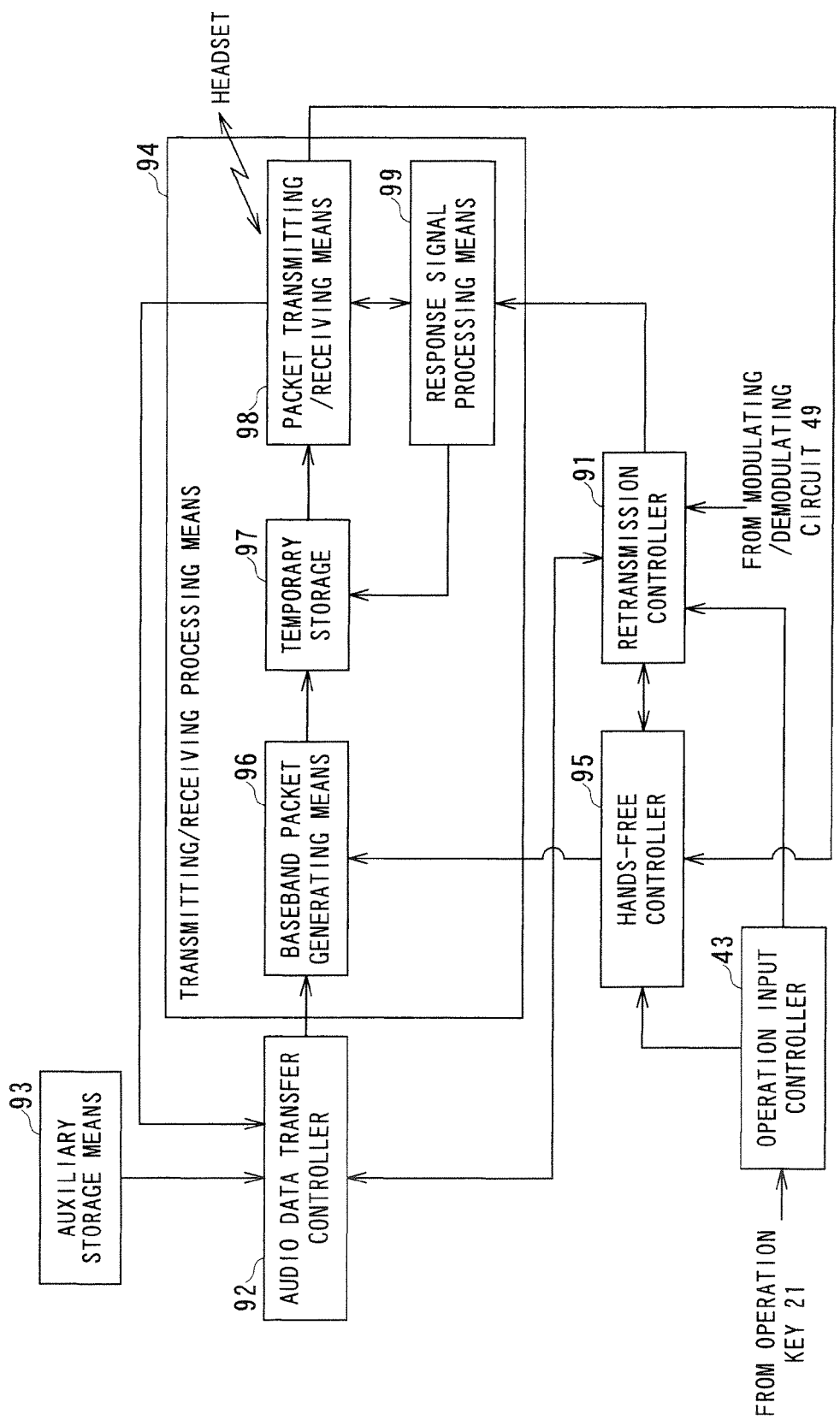
FIG. 4 is a block diagram showing a mechanical construction that a first embodiment of the cellular phone applicable as an information processing apparatus according to the invention can be implemented.

FIG. 4 shows a mechanical and functional construction of a first embodiment of the cellular phone 3 applicable as an information processing apparatus of the present invention. The same reference numerals are given to those corresponding to the components in FIG. 2, and the repeated description will be omitted herein.

A retransmission control means 91 may be represented by the controller 41 in FIG. 2, for example, which monitors whether an instruction of request for transferring audio data (audio data transfer request) has been given by manipulating an operation key 21 by a user or not based on an instruction from an operation input controller 43. If it is detected that the instruction for audio data transfer request has been given, the retransmission control means 91 generates an audio-data transfer mode retransmission control signal for controlling the retransmission in audio data transfer mode and supplies it to a response signal processing means 99 of a transmitting/receiving processing means 94. Furthermore, the retransmission control means 91 generates an audio data transfer request for requesting the transfer of audio data to an audio data transfer control means 92 and supplies the audio data transfer request to the audio data transfer control means 92.

The retransmission control means 91 further monitors whether the other cellular phone 3, for example, has called thereto through the transmitting/receiving circuit 53 and the modulating/demodulating circuit 49 or not. If it is detected that the other cellular phone 3 has called thereto, the retransmission control means 91 generates hands-free mode retransmission control signal for controlling the retransmission in hands-free mode and supplies it to the response signal processing means 99 of the transmitting/receiving processing means 94. The retransmission control means 91 further supplies a call notification indicating the fact that there has been called to a hands-free control means 95.

The audio data transfer control means 92 may be represented by the controller 41 in FIG. 2, for example, which obtains a request for transferring audio data supplied from the retransmission control means 91, establishes an audio data transfer session with the headset 7 based on the obtained audio data transfer request, and controls the transfer of the audio data to the headset 7. In other words, the audio data transfer control means 92 reads out the audio data stored in an auxiliary storage means 93, extracts the read-out audio data in frames suitable for a given codec scheme, generates RTP packets storing the extracted audio data in frames, and supplies the RTP packets to the transmitting/receiving processing means 94.

The auxiliary storage means 93 may be implemented by the storage 57 in FIG. 2 and pre-stores the audio data obtained through the memory card 56 or over a network 6. The auxiliary storage means 93 pre-stores data required for driving components in the cellular phone 3. The audio data stored in the auxiliary storage means 93 may be encoded in advance by a predetermined codec scheme (such as MP3 or AAC).

The transmitting/receiving processing means 94 may be represented by the Bluetooth module 59 in FIG. 2, for example, which includes a baseband packet generating means 96, a temporary storage means 97, a packet transmitting/receiving means 98 and the response signal processing means 99.

The baseband packet generating means 96 may be implemented by the Bluetooth module 59 in FIG. 2, for example, which sequentially obtains RTP packets supplied from the audio data transfer control means 92, stores the sequentially obtained RTP packets, and generates L2CAP packets having an L2CAP header at the beginning. Next, the baseband packet generating means 96 stores the L2CAP packets, generates baseband packets having a header at the beginning, and sequentially supplies the baseband packets to the temporary storage means 97 (which achieves a function of temporarily storing a packet into a buffer in the Bluetooth module 59, for example).

The baseband packet generating means 96 obtains a processed digital voice signal supplied from the hand-free control means 95, stores the obtained processed digital voice signal, generates baseband packets having a header at the beginning, and sequentially supplies the baseband packets to the temporary storage means 97.

The temporary storage means 97 may be implemented by the Bluetooth module 59 in FIG. 2, for example, which sequentially obtains the baseband packets supplied from the baseband packet generating means 96 and temporarily stores the sequentially obtained baseband packets.

The packet transmitting/receiving means 98 reads out the baseband packets (including an unsent baseband packet) temporarily stored in the temporary storage means 97 and transmits the read-out baseband packets to the headset 7 through the wireless communication.

The packet transmitting/receiving means 98 may be implemented by the Bluetooth module 59 in FIG. 2, for example, which obtains a success/failure notification (that is, check-positive response signal or a check-negative response signal) on the communication of each packet from the headset 7, and supplies the success/failure notification (check-positive response signal or check-negative response signal) on the communication of the obtained each packet to the response signal processing means 99.

The response signal processing means 99 may be implemented by the Bluetooth module 59 in FIG. 2, for example, which obtains the success/failure notification (check-positive response signal or check-negative response signal) on the communication of each packet supplied from the packet transmitting/receiving means 98 and determine whether the communication of the given baseband packet has succeeded or not based on the obtained success/failure notification (check-positive response signal or check-negative response signal) on the communication of each packet. If it is determined that the communication of the baseband packet has succeeded, the response signal processing means 99 does not generate a retransmission instruction, that instructs the retransmission of the baseband packet, in order to transmit the next baseband packet.

On the other hand, if it is determined that the communication of the baseband packet has failed, the response signal processing means 99 generates a first retransmission instruction for retransmitting the baseband packet so as to prevent the delay of the data transmission based on the audio data transfer mode retransmission control signal for controlling the retransmission in the audio data transfer mode, which is supplied from the retransmission control means 91, and supplies the first retransmission instruction to the packet transmitting/receiving means 98.

Alternatively, if it is determined that the communication of the baseband packet has failed, the response signal processing means 99 generates a second retransmission instruction for retransmitting the baseband packet to prevent the loss of the data to be transmitted based on the hands-free mode retransmission control signal for controlling the retransmission in hands-free mode, which is supplied from the retransmission control means 91, and supplies the second retransmission instruction to the packet transmitting/receiving means 98.

The hands-free control means 95 may be represented by the controller 41 in FIG. 2, for example, which establishes a hands-free session with the headset 7, obtains a call notification supplied from the retransmission control means 91, performs call control (including a series of steps of connection request, call, response, talk and disconnection) in the calling mode by using the obtained call notification, and performs hands-free control between the cellular phone 3 and the headset 7.

Figure 5:
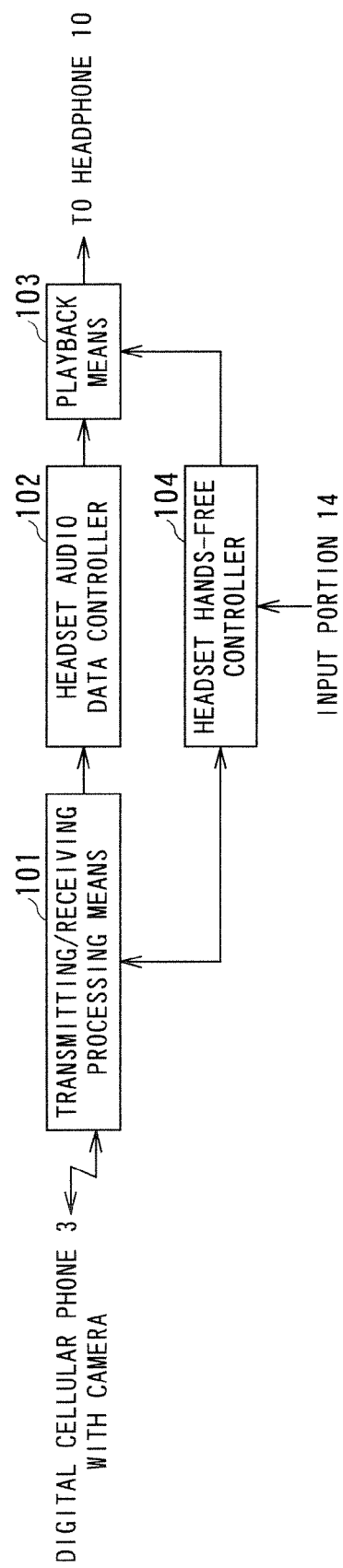
FIG. 5 is a block diagram showing a mechanical construction that a headset applicable as a terminal according to the invention can be implemented.

FIG. 5 shows a mechanical construction capable of implementing the first embodiment of the headset 7 applicable as a terminal of the present invention.

A transmitting/receiving means 101 may be implemented by the Bluetooth module 87 in FIG. 3, for example, which receives baseband packets transmitted from the cellular phone 3 through the wireless communication and supplies the received baseband packets to a headset audio data control means 102 or headset hands-free control means 104.

The headset audio data control means 102 may be represented by the CPU 81, ROM 82 and RAM 83 in FIG. 3, for example, which establishes an audio data transfer session with the cellular phone 3 and performs control over audio data from the cellular phone 3. In other words, the headset audio data control means 102 obtains the baseband packets supplied from the transmitting/receiving processing means 101, reproduces the original audio data based on the obtained baseband packets, and supplies the reproduced original audio data to a playback (or playing) means 103.

The playback means 103 may be represented by the CPU 81, ROM 82 and RAM 83 in FIG. 3, for example, which obtains the original audio data supplied from the headset audio data control means 102, decodes the obtained original audio data by a predetermined codec scheme and outputs the corresponding analog audio data to the headphone 10 and is then played back.

The headset hands-free control means 104 may be represented by the CPU 81, ROM 82 and RAM 83 in FIG. 3, for example, which establishes a hands-free session with the cellular phone 3 and performs hands-free control with the cellular phone 3.

Figure 6:
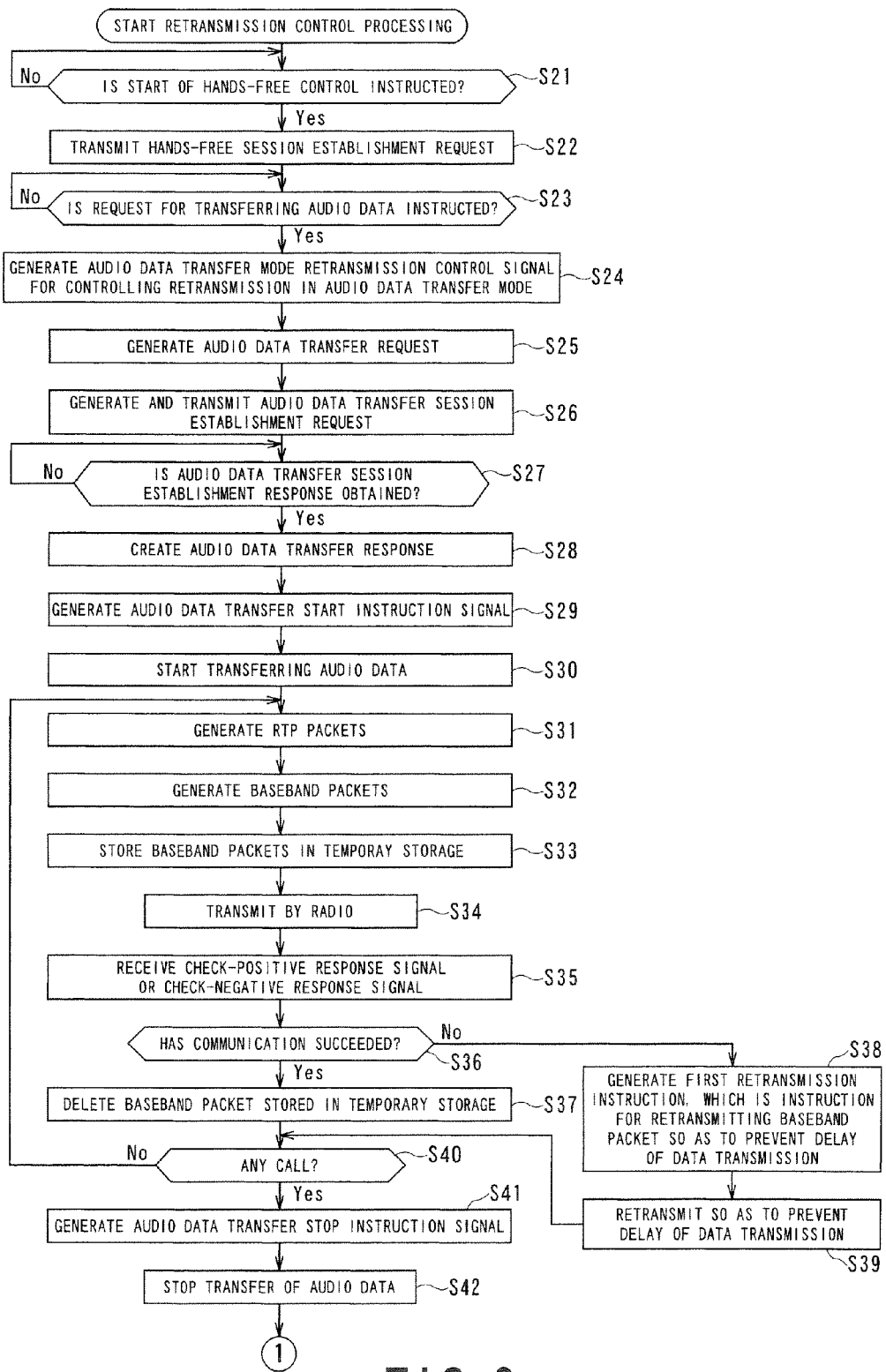
FIG. 6 is a flowchart describing retransmission control processing in the cellular phone in FIG. 4.
Figure 7:
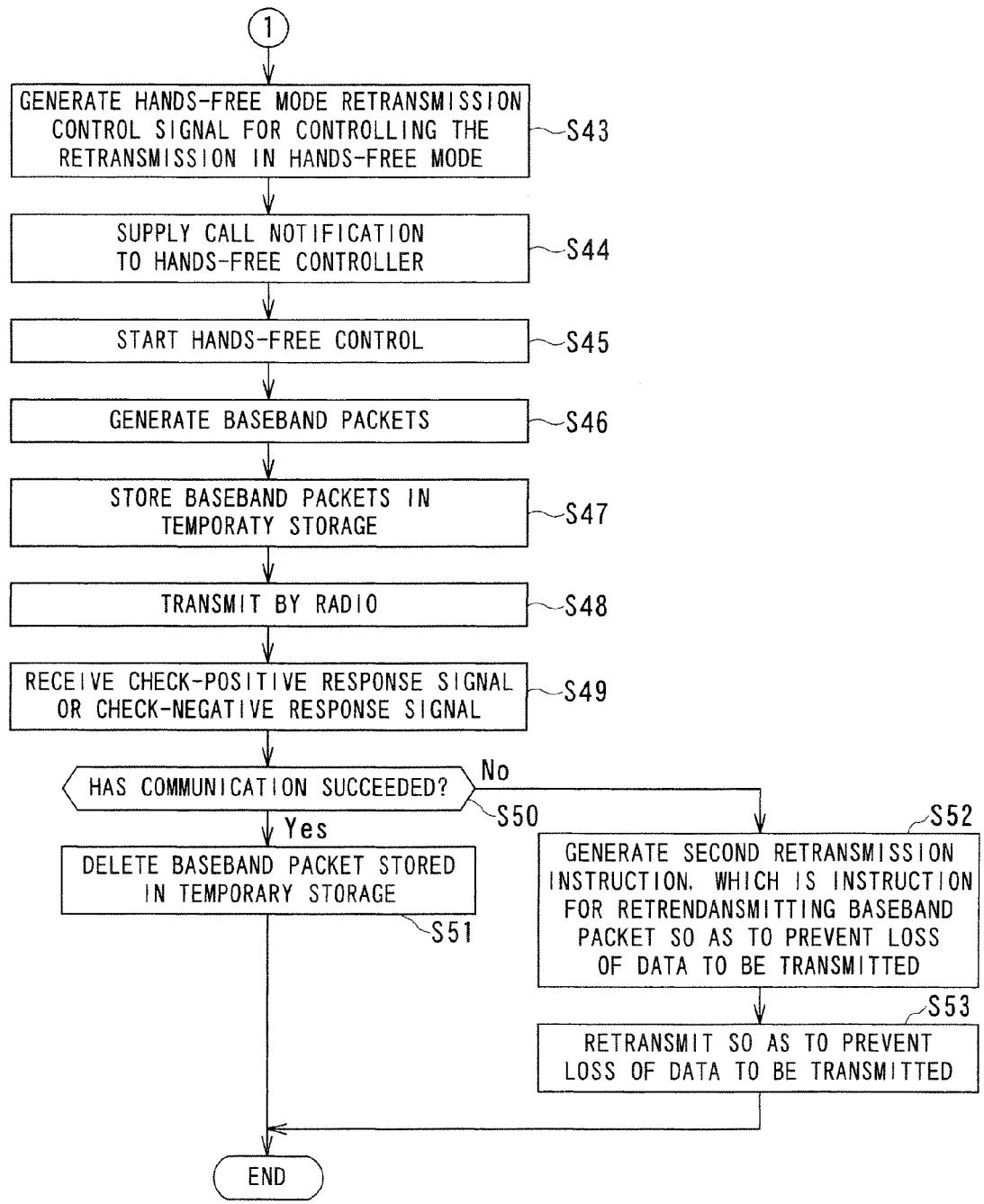
FIG. 7 is a flowchart describing the retransmission control processing in the cellular phone in FIG. 4.

Next, the flowcharts in FIGS. 6 and 7 show the retransmission control processing in the cellular phone 3 in FIG. 4. The retransmission control processing starts in response to an instruction for starting hands-free control by manipulating the operation key 21 by a user.

In step S21, the hands-free control means 95 monitors whether a user has instructed to start hands-free control by manipulating the operation key 21 or not.

If it is detected in step S21 that the user has instructed to start hands-free control by manipulating the operation key 21, the hands-free control means 95 in step S22 generates a hands-free session establishment request that requests the establishment of a hands-free session with the headset 7 and transmits the hands-free session establishment request to the headset 7 through the transmitting/receiving processing means 94 through the wireless communication.

Then, the hands-free control means 95 obtains a hands-free session establishment response, which is a response to the hands-free session establishment request, from the headset 7 through the transmitting/ receiving processing means 94. Thus, a hands-free session is established between the cellular phone 3 and the headset 7.

In step S23, the retransmission control means 92 determines whether a user has instructed to request for transferring audio data (audio data transfer request) by manipulating the operation key 21 or not based on an instruction from the operation input controller 43.

If it is determined in step S23 that the instruction for requesting the transfer of the audio data (audio data transfer request) has been given, the retransmission control means 91 generates in step S24 an audio data transfer mode retransmission control signal for controlling the retransmission in the audio data transfer mode and supplies the audio data transfer mode retransmission control signal to the response signal processing means 99 of the transmitting/receiving processing means 94.

In step S25, the retransmission control means 91 generates an audio data transfer request for requesting the transfer of audio data and supplies the audio data transfer request to the audio data transfer control means 92.

In step S26, the audio data transfer control means 92 obtains the audio data transfer request supplied from the retransmission control means 91, generates an audio data transfer session establishment request for requesting the establishment of an audio data transfer session with the headset 7 based on the obtained audio data transfer request, and transmits the audio data transfer session establishment request to the headset 7 through the transmitting/receiving processing means 94.

In step S27, the audio data transfer control means 92 determines whether the audio data transfer session establishment response, which is a response corresponding to the audio data transfer session establishment request, has been obtained from the headset 7 through the packet transmitting/receiving means 98 of the transmitting/receiving processing means 94 or not and waits until the determination that the audio data transfer session establishment response has been obtained from the headset 7.

If it is determined in step S27 that the audio data transfer session establishment response has been obtained from the headset 7, the audio data transfer control means 92 generates in step S28 an audio data transfer response indicating the fact that the audio data response transfer session establishment response has been obtained from the headset 7 and supplies the audio data transfer response to the retransmission control means 91.

Thus, the audio data transfer session is established between the cellular phone 3 and the headset 7. Further, in this case, the audio data transfer session and the hands-free session are simultaneously established between the cellular phone 3 and the headset 7 based on the profile for the audio data transmission and the profile for call control in the calling mode.

In step S29, the retransmission control means 91 obtains the audio data transfer response supplied from the audio data transfer control means 92, recognizes that the audio data transfer session establishment response has been obtained from the headset 7 based on the obtained audio data transfer response, generates an audio data transfer start instruction signal for instructing the audio data transfer control means 92 to start the transfer of audio data, and supplies the audio data transfer start instruction signal to the audio data transfer control means 92.

In step S30, the audio data transfer control means 92 starts the transfer of audio data based on the audio data transfer start instruction signal supplied from the retransmission control means 91.

In step S31, the audio data transfer control means 92 reads out the audio data stored in the auxiliary storage means 93, extracts the read-out audio data in frames suitable for a codec scheme, sequentially generates RTP packets storing the extracted audio data in frames, and sequentially supplies the RTP packets to the transmitting/receiving processing means 94.

In step S32, the baseband packet generating means 96 of the transmitting/receiving processing means 94 sequentially obtains the RTP packets supplied from the audio data transfer control means 92, stores the sequentially obtained RTP packets, and generates L2CAP packets having an L2CAP header at the beginning. Next, the baseband packet generating means 96 stores the created L2CAP packets, generates the baseband packets having a header at the beginning, and sequentially supplies the baseband packets to the temporary storage means 97.

In step S33, the temporary storage means 97 sequentially obtains the baseband packets supplied from the baseband packet generating means 96 and temporarily stores the sequentially obtained baseband packets.

In step S34, the packet transmitting/receiving means 98 reads out the baseband packets temporarily stored in the temporary storage means 97 and transmits the read-out baseband packets to the headset 7 through the wireless communication. Thus, the audio data can be streaming-transferred from the cellular phone 3 to the headset 7 in realtime to the response signal processing means 99.

In step S35, the packet transmitting means 98 receives the success/failure notification (check-positive response signal or check-negative response signal) on the communication of each packet from the headset 7 and supplies the received success/failure notification (check-positive response signal or check-negative response signal) on the communication of each packet from the headset 7.

In step S36, the response signal processing means 99 obtains the success/failure notification (check-positive response signal or check-negative response signal) on the communication of each packet from the headset 7, which is supplied from the packet transmitting/receiving means 98, and determines whether the communication of the baseband packet has succeeded or not based on the obtained success/failure notification (check-positive response signal or check-negative response signal) on the communication of each packet. In other words, if the obtained success/failure notification on the communication of each packet is the check-positive response signal, the success of the communication of the baseband packet is determined. On the other hand, if the obtained success/failure notification on the communication of each packet is the check-negative response signal, the failure of the communication of the baseband packet is determined.

If the success of the communication of the baseband packet is determined in step S36, the response signal processing means 99 notifies the temporary storage means 97 that the baseband packet (which has already succeeded in communication) stored in the temporary storage means 97 is to be deleted.

In step S37, the temporary storage means 97 deletes the baseband packet (which has been already successful in communication) stored in the temporary storage means 97 based on the notification that the baseband packet (which has been already successful in communication) stored in the temporary storage means 97 is to be deleted, which is supplied from the response signal processing means 99 and. In this case, the baseband packet having succeeded in communication is not retransmitted.

On the other hand, if the failure of the communication of the baseband packet is determined in step S36, the response signal processing means 99 in step S38 generates a first retransmission instruction for retransmitting the baseband packet so as to prevent the delay of the data transmission, based on the audio data transfer mode retransmission control signal for controlling the retransmission in the audio data transfer mode, which is supplied from the retransmission control means 91, and supplies the first retransmission instruction to the packet transmitting/receiving means 98.

In step S39, the packet transmitting/receiving means 98 reads out an unsent baseband packet (which has failed in communication) temporarily stored in the temporary storage means 97 based on the first retransmission instruction supplied from the response signal processing means 99 and retransmits the read unsent baseband packet (which has been failed in communication) to the headset 7 by wireless communication so as to prevent the delay of the data transmission.

More specifically, in the standard (such as Advanced Audio Distribution Profile) for streaming-transferring audio data in realtime among Bluetooth standards, the realtime streaming transfer has a higher priority than the secure transmission of all baseband packets in the streaming transfer of audio data.

Therefore, if the communication of a baseband packet fails, the retransmission of the baseband packet having failed in communication is repeated until a predetermined time (flash time) for each baseband packet. However, at the flash time, the transmission of the failed baseband packet is abandoned (that is, the packet dropping is admitted), and flash processing (that is, the processing of clearing the baseband packet stored in the temporary storage means 97) is performed. Then, the transmission of the next baseband packet is started.

Thus, the retransmission of the packet having failed in communication can be performed with an acceptable realtime level on the playing (playback) side in the audio data streaming transfer in which the realtime characteristic has a higher priority.

If the retransmission of the unsent baseband packet is succeeded in the retransmission processing in step S39, the unsent baseband packet stored in a transmission queue is deleted.

In step S40, the retransmission control means 91 of the cellular phone 3 determines whether the other cellular phone 3, for example, has called through the transmitting/receiving circuit 53 and/or the modulating/demodulating circuit 49 or not.

If no call from the other cellular phone 3, for example, is determined in step S40, the processing returns to step S31, and the processing in step S31 and subsequent steps are repeated.

Thus, the streaming transfer of the audio data can be performed between the cellular phone 3 and the headset 7, and, at the same time, the retransmission of a packet having failed in communication can be performed with an acceptable realtime level on the playback side until the other cellular phone 3 calls the cellular phone 3.

On the other hand, if a call from the other cellular phone 3 is determined in step S40, the retransmission control means 91 in step S41 generates an audio data transfer stop instruction signal for instructing the audio data transfer control means 92 to stop the transfer of the audio data and supplies the audio data transfer stop instruction signal to the audio data transfer control means 92.

In step S42, the audio data transfer control means 92 stops the transfer of audio data based on the audio data transfer stop instruction signal supplied from the retransmission control means 91. In other words, the realtime streaming transfer of the audio data from the cellular phone 3 to the headset 7 is temporarily stopped.

In step S43 in FIG. 7, the retransmission control means 91 generates a hands-free mode retransmission control signal for controlling the retransmission in the hands-free mode and supplies the hands-free mode retransmission control signal to the response signal processing means 99 of the transmitting/receiving processing means 94.

In step S44, the retransmission control means 92 supplies a call notification indicating that there has been a call to the hands-free control means 95.

The hands-free control means 95 in step S45 obtains the call notification supplied from the retransmission control means 91, starts call control in the calling mode based on the obtained call notification and starts the hands-free control between the cellular phone 3 and the headset 7.

More specifically, the hands-free control means 95 first generates a voice connection request for requesting voice connection between the cellular phone 3 and the headset 7 and supplies the voice connection request to the baseband packet generating means 96 of the transmitting/receiving processing means 94.

In step S46, the baseband packet generating means 96 of the transmitting/receiving means 94 obtains the voice connection request supplied from the hands-free control means 95, stores the obtained voice connection request, and generates L2CAP packets having an L2CAP header at the beginning. Next, the baseband packet generating means 96 stores the L2CAP packets, generates the baseband packets having a header at the beginning, and supplies the baseband packets to the temporary storage means 97.

In step S47, the temporary storage means 97 sequentially obtains the baseband packets supplied from the baseband packet generating means 96 and temporarily stores the sequentially obtained baseband packets.

In step S48, the packet transmitting/receiving means 98 reads out the baseband packets temporarily stored in the temporary storage means 97 and transmits the read baseband packets to the headset 7 through the wireless communication.

In step S49, the packet transmitting means 98 obtains the success/failure notification (check-positive response signal or check-negative response signal) on the communication of each packet from the headset 7 and supplies the obtained success/failure notification (check-positive response signal or check-negative response signal) on the communication of each packet from the headset 7 to the response signal processing means 99.

In step S50, the response signal processing means 99 obtains the success/failure notification (check-positive response signal or check-negative response signal) on the communication of each packet from the headset 7, which is supplied from the packet transmitting/receiving means 98, and determines whether the communication of a given baseband packet has been successful or not based on the obtained success/failure notification (check-positive response signal or check-negative response signal) on the communication of each packet. In other words, if the obtained success/failure notification on the communication of each packet is the check-positive response signal, the success of the communication of the baseband packet is determined.

On the other hand, if the obtained success/failure notification on the communication of each packet is the check-negative response signal, the failure of the communication of the baseband packet is determined.

If the success of the communication of the baseband packet is determined in step S50, the response signal processing means 99 notifies the temporary storage means 97 that the baseband packet (which has been already successful in communication) stored in the temporary storage means 97 is to be deleted.

In step S51, the temporary storage means 97 deletes the baseband packet (which has been already successful in communication) stored in the temporary storage means 97 based on the notification that the baseband packet (which has been already successful in communication) stored in the temporary storage means 97 is to be deleted, which is supplied from the response signal processing means 99.

On the other hand, if the failure of the communication of the baseband packet is determined in step S50, the response signal processing means 99 in step S52 generates a second retransmission instruction for retransmitting the baseband packet so as to prevent the loss of data to be transmitted (such as the voice connection request), based on the hands-free mode retransmission control signal for controlling the retransmission in hands-free mode, which is supplied from the retransmission control means 91, and supplies the second retransmission instruction to the packet transmitting/receiving means 98.

In step S53, the packet transmitting/receiving means 98 reads out an unsent baseband packet (which has failed in communication) temporarily stored in the temporary storage means 97 based on the second retransmission instruction supplied from the response signal processing means 99 and retransmits the read-out unsent baseband packet (which has failed in communication) to the headset 7 through the wireless communication so as to prevent the loss of the data to be transmitted.

In other words, in the standard (such as Hands Free Profile) for performing call control processing in calling mode by phones between the cellular phone 3 and the headset 7 compliant with the wireless communication to allow the hands-free talking from the headset 7 among Bluetooth standards, the prevention of the loss of data to be transmitted has a higher priority, and the realtime characteristic in the headset 7 is not required very much.

Accordingly, if the communication of a baseband packet fails, the retransmission of the baseband packet is repeated until the communication is succeeded without performing flash processing, which is to be performed in the streaming transfer of the audio data.

Thus, the packet having failed in communication can be retransmitted until the communication in the hands-free mode, in which the prevention of the loss of transmit data has a higher priority, is succeeded. For example, if the communication of the data on a voice connection request for requesting voice connection between the cellular phone 3 and the headset 7, for example, fails, the packet can be retransmitted until the transmission of the voice connection request to the headset 7 is succeeded.

Then, the hands-free control means 95 obtains a voice connection response, which is a response to the voice connection request from the headset 7 through the packet transmitting/receiving means 98 of the transmitting/receiving means 94. Thus, voice connection mode is turned on between the cellular phone 3 and the headset 7.

Next, the hands-free control means 95 supplies the obtained call notification (that is, the call notification supplied from the retransmission control means 91) to the baseband packet generating means 96 of the transmitting/receiving processing means 94. Then, the processing in step S46 to S53 is performed, and the data to be transmitted is retransmitted to the headset 7 through the wireless communication so as to prevent the loss of the data to be transmitted. Thus, the packet is retransmitted until the success of the transmission of the call notification to the headset 7.

In the same manner, performing the processing in steps S45 to S53 allows the retransmission of the packet having failed in communication until the communication is succeeded so as to prevent the loss of the transmit data in call control (including a series of steps of connection request, call, response, talk and disconnection) in the calling mode between the cellular phone 3 and the headset 7.

When a user requests to talk by manipulating the input portion 14 of the headset 7, talking with hands free is started between the cellular phone 3 and the headset 7.

According to an embodiment of the present invention, packet retransmission to prevent the delay of data transmission in realtime streaming transfer of audio data, which requests realtime characteristic, can be performed and the packet retransmission can be performed so as to prevent the loss of the data to be transmitted in call control in the calling mode requesting no packet dropping. Thus, when multiple profiles are operated in connection, a retransmission procedure suitable for each of the profiles can be implemented.

Figure 8:
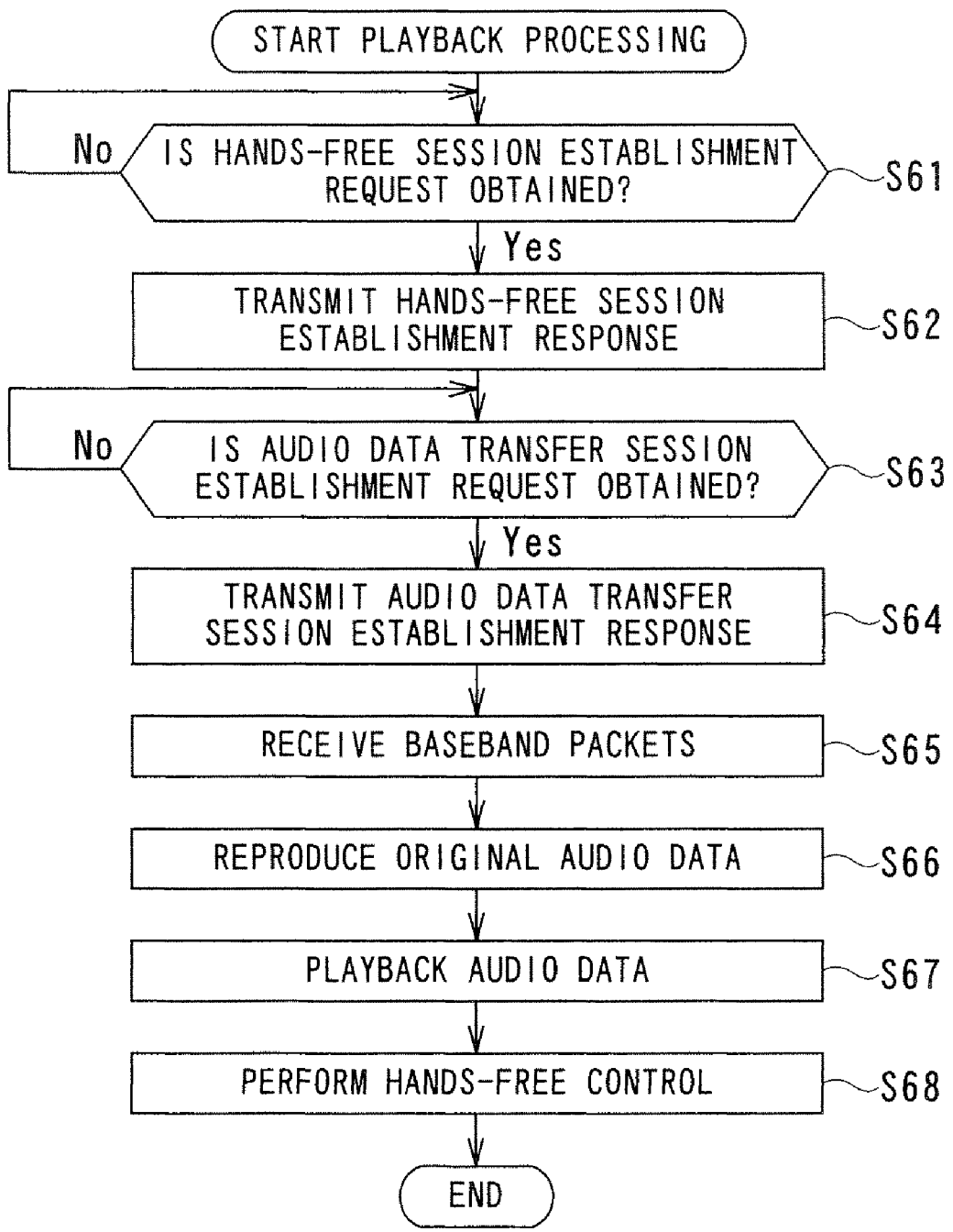
FIG. 8 is a flowchart describing retransmission control processing in the headset in FIG. 5.

Next, the flowchart in FIG. 8 shows playback processing in the headset in FIG. 5, which corresponds to the retransmission control processing in the cellular phone 3 in FIGS. 6 and 7.

In step S61, the headset hands-free control means 104 determines whether or not a hands-free session establishment request has been obtained from the cellular phone 3 through the transmitting/receiving processing means 101 and waits until it is determined that a hands-free session establishment request has been obtained from the cellular phone 3.

If it is determined in step S61 that the hands-free session establishment request has been obtained from the cellular phone 3, the headset hands-free control means 104 in step S62 generates a hands-free session establishment response, which is a response to the hands-free session establishment request from the cellular phone 3, and transmits the hands-free session establishment response to the cellular phone 3 through the transmitting/receiving processing means 101.

In step S63, the headset audio data control means 102 determines whether or not an audio data transfer session establishment request has been obtained from the cellular phone 3 through the transmitting/receiving processing means 101, and waits until it is determined that an audio data transfer session establishment request has been obtained from the cellular phone 3.

If it is determined in step S63 that the audio data transfer session establishment request has been obtained from the cellular phone 3, the headset audio data control means 102 in step S64 generates an audio data transfer session establishment response, which is a response to the audio data transfer session establishment request from the cellular phone 3 and transmits the audio data transfer session establishment response to the cellular phone 3 through the transmitting/recouping processing means 101.

In step S65, the transmitting/receiving processing means 101 receives baseband packets (that is, baseband packets storing audio data) transmitted from the cellular phone 3 through the wireless communication and supplies the received baseband packets to the headset audio data control means 102.

In step S66, the headset audio data control means 102 obtains the baseband packets supplied from the transmitting/receiving processing means 101, reproduces the original audio data based on the obtained baseband packets and supplies the reproduced original audio data to the playback means 103.

In step S67, the playback means 103 obtains the original audio data supplied from the headset audio data control means 102, decodes the obtained original audio data by a predetermined codec scheme and outputs the corresponding analog audio data to the headphone 10 to be played back. Thus, a user can hear the music from the cellular phone 3 substantially in realtime through the headset 7.

Thereafter, when the cellular phone 3 receives a call from the other cellular phone 3 through the base station 2, the transfer of the audio data is temporarily stopped. Then, in step S68, the headset hands-free control means 104 performs call control in the calling mode and performs hands-free control with the cellular phone 3. Thus, hands-free talking becomes available between the cellular phone 3 and the headset 7, and the user can talk with the other user, which is the owner of the other cellular phone 3, with hands free.

Incidentally, the communication speed and communication quality in data communication through the wireless communication between the cellular phone 3 and the headset 7 largely depend on the state of the transmission path, that is, the distance between the equipment and/or influences of other radio equipment. The decrease in the communication quality may increase the frequency of occurrence of errors in the communication, and therefore, the number of fails in communication for the transmission of a packet from the cellular phone 3 to the headset 7. Accordingly, the frequency of occurrence of errors in each predetermined period of time may be calculated, and a preferable retransmission procedure may be controlled by using the calculated frequency of occurrence of error.

A second embodiment of the present invention using the method mentioned above will be described below.

Second Embodiment

Figure 9:
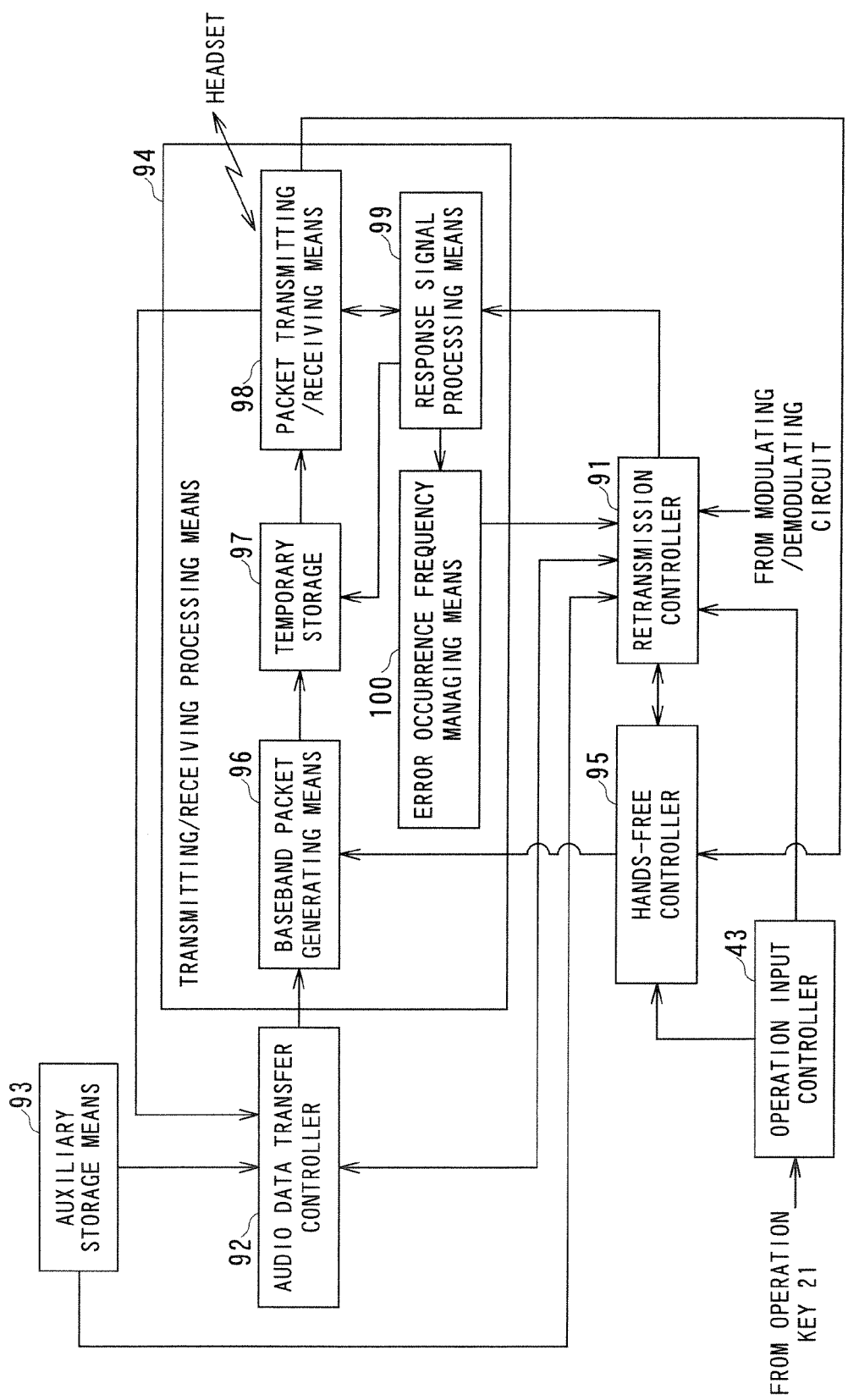
FIG. 9 is a block diagram showing a mechanical construction that a second embodiment of the cellular phone applicable as an information processing apparatus according to the invention can be implemented.

FIG. 9 shows another mechanical construction in which a second embodiment of the cellular phone 3 applicable as an information processing apparatus of the present invention can be implemented. The same reference numerals are given to those corresponding to the components in the construction in FIG. 4, and the repetitive description will be omitted herein. Furthermore, the repetitive description of the components, which are basically the same as those described with reference to FIGS. 1 to 3 and 5, will be also omitted herein.

The auxiliary storage means 93 may be represented by the storage 57 in FIG. 2, for example, and is adapted to store data of a predetermined reference value relating to a predefined frequency of occurrence of errors.

The transmitting/receiving processing means 94 may be represented by the Bluetooth module 59 in FIG. 2, for example, and includes the baseband packet generating means 96, the temporary storage means 97, the packet transmitting/receiving means 98, the response signal processing means 99 and an error occurrence frequency managing means 105.

The error occurrence frequency managing means 105 may be implemented by the Bluetooth module 59 in FIG. 2, for example, and obtains the success/failure notification (check-positive response signal or check-negative response signal) on the communication of each packet, which is supplied from the response signal processing means 99 within a predetermined period of time, calculates the frequency of occurrence of errors within a predetermined period of time based on the success/failure notification (check-positive response signal or check-negative response signal) on the communication of each packet, which is obtained within a predetermined period of time, and updates the current frequency of the occurrence of errors between the cellular phone 3 and the headset 7 based on the calculated frequency of the occurrence of errors.

The error occurrence frequency managing means 105 supplies the updated latest frequency of the occurrence of errors between the cellular phone 3 and the headset 7 to the retransmission control means 91.

Figure 10:
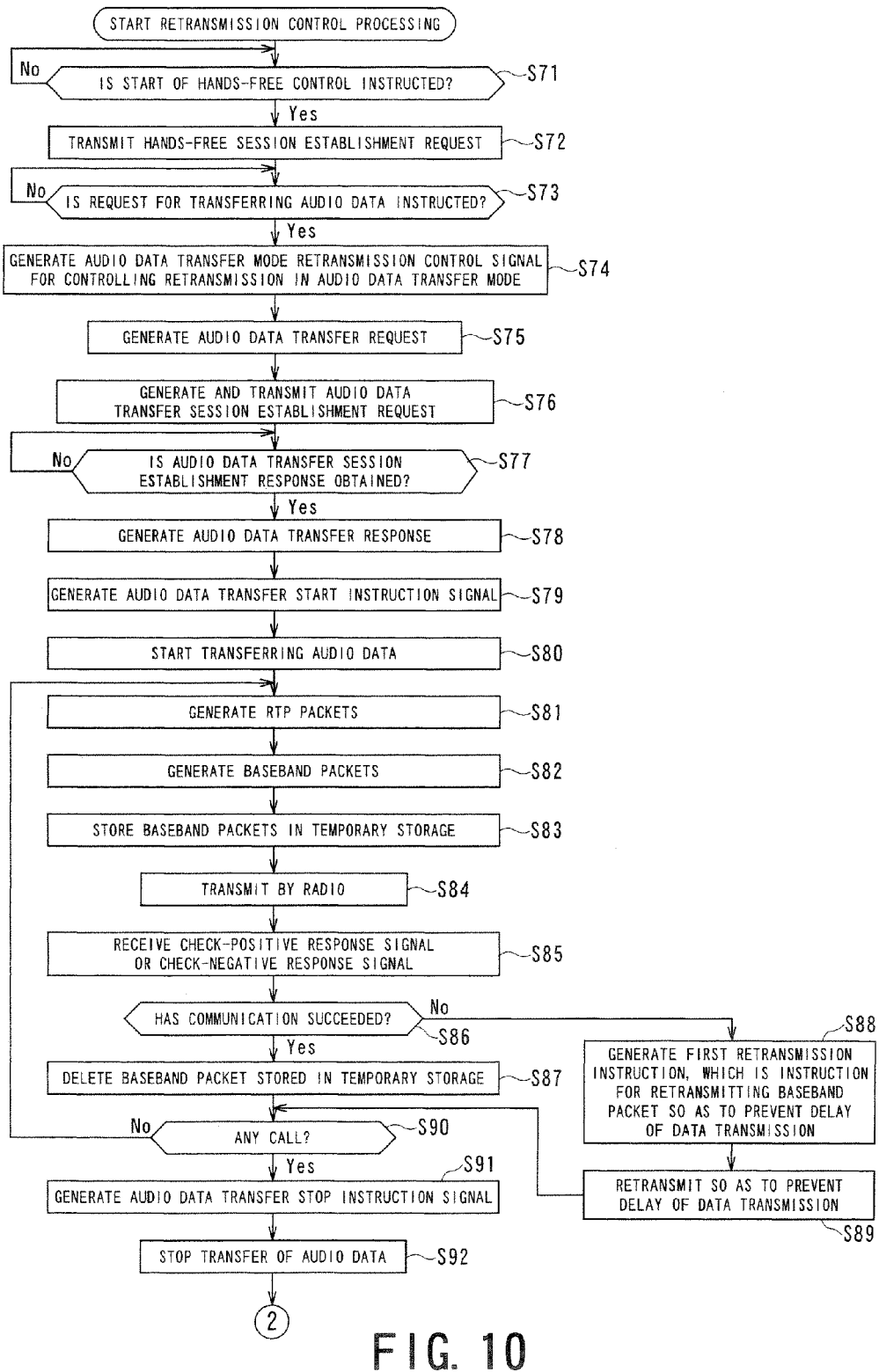
FIG. 10 is a flowchart describing the retransmission control processing in the cellular phone in FIG. 9.
Figure 11:
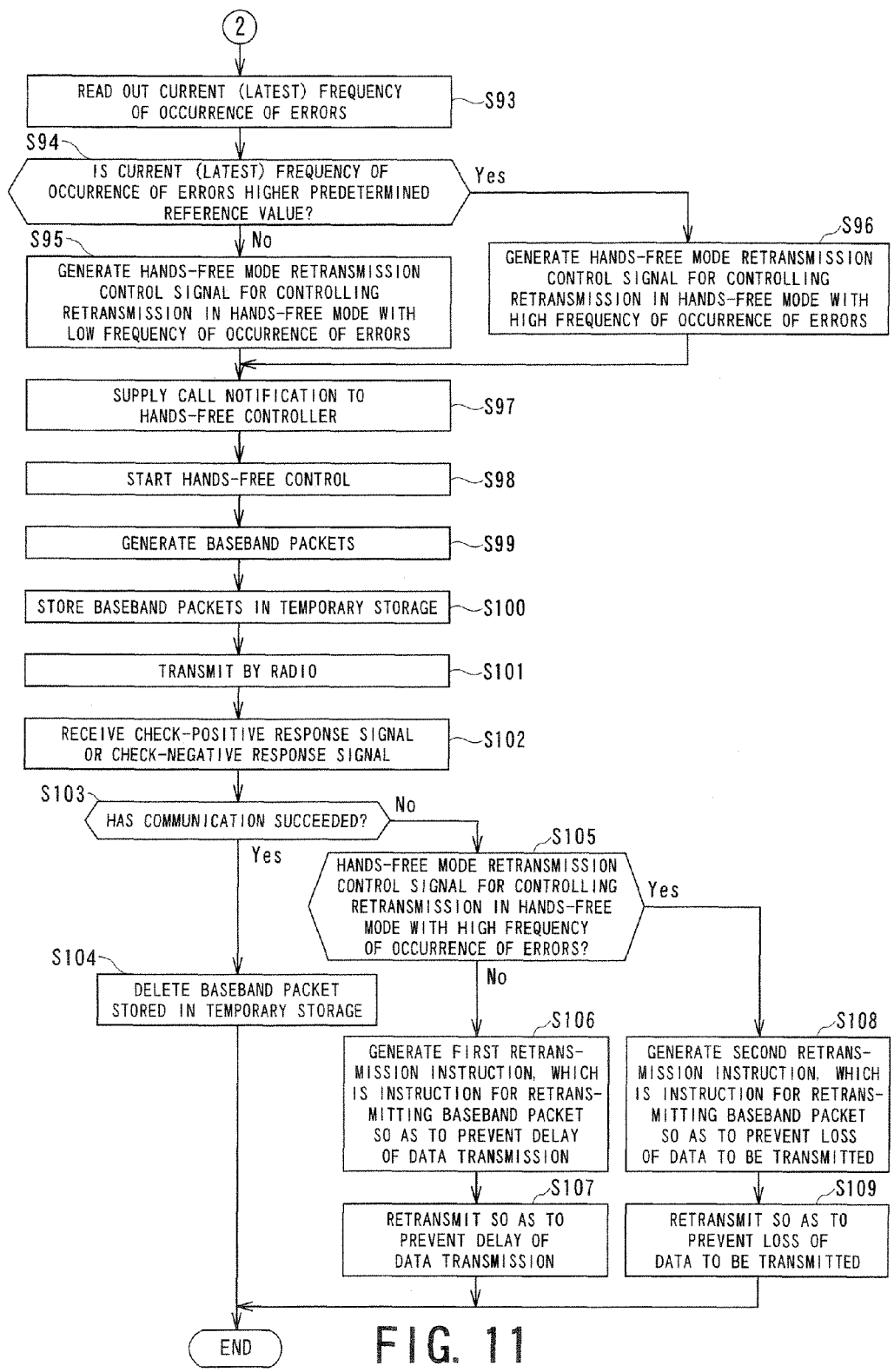
FIG. 11 is a flowchart describing retransmission control processing in the cellular phone in FIG. 9.

Next, with reference to the flowcharts in FIGS. 10 and 11, the retransmission control processing in the cellular phone 3 in FIG. 9 will be described. The processing in steps S71 to S92 and S97 to S104 in FIGS. 10 to 11 are the same as the processing in steps S21 to S42 and steps S44 to S51 in FIGS. 6 and 7, and the repeated description will be omitted herein.

The retransmission control processing is started in response to the instructions to start the control over the hands-free mode by a user by manipulating the operation key 21.

Figure 12:
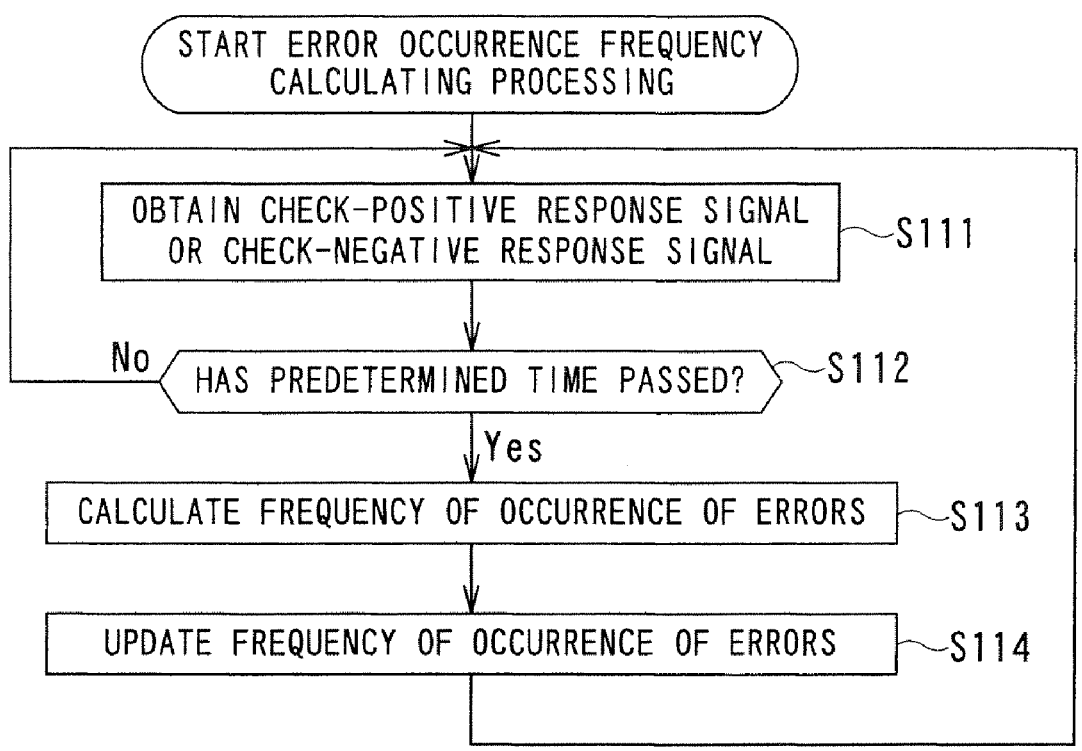
FIG. 12 is a flowchart describing processing of calculating the frequency of occurrence of errors in the cellular phone in FIG. 9.

First of all, the processing in steps S71 to S90 implements the realtime streaming transfer of audio data between the cellular phone 3 and the headset 7. Here, the error occurrence frequency calculating processing is performed in parallel with the retransmission control processing in FIGS. 10 and 11. FIG. 12 shows the details of the error occurrence frequency calculating processing.

With reference to the flowchart in FIG. 12, the error occurrence frequency calculating processing in the cellular phone 3 in FIG. 9 will be described.

In step S111, the error occurrence frequency managing means 105 obtains the success/failure notification (check-positive response signal or check-negative response signal) on the communication of each packet, which is supplied from the response signal processing means 99 within a predetermined period of time.

In step S112, the error occurrence frequency managing means 105 determines whether a predetermined period of time has passed or not.

If it is determined in step S112 that the predetermined period of time has not passed, the processing returns to step S111, and the processings in step S111 and subsequent steps are then repeated. Thus, the success/failure notification (check-positive response signal or check-negative response signal) on the communication of each packet can be sequentially obtained in the packet transmission performed within the predetermined period of time.

If it is determined in step S112 that the predetermined period of time has passed, the error occurrence frequency managing means 105 in step S113 calculates the frequency of the occurrence of errors within the predetermined period of time based on the success/failure notification (check-positive response signal or check-negative response signal) on the communication of each packet, which is obtained within the predetermined period of time. For example, the value such as 30 times out of 100 may be calculated as the frequency of the occurrence of errors in one minute, for example. Apparently, the frequency of the occurrence of errors may be expressed as a percentage or may be expressed as other values.

In step S114, the error occurrence frequency managing means 105 updates the current (latest) frequency of the occurrence of errors between the cellular phone 3 and the headset 7 based on the calculated frequency of the occurrence of errors. In other words, when the frequency of the occurrence of errors is 30 times out of 100 in the first one minute and 50 times out of 100 in the next one minute, the frequency of the occurrence of errors between the cellular phone 3 and the headset 7 is updated from 30 times out of 100 to 50 times out of 100.

Referring back to FIG. 11, the retransmission control means 91 in step S93 reads out the current (latest) frequency of the occurrence of errors managed by the error occurrence frequency managing means 105.

In step S94, the retransmission control means 91 reads out a predetermined reference value relating to the frequency of the occurrence of errors pre-stored in the auxiliary storage means 93 and determines whether or not the read-out current (latest) error occurrence frequency is higher than the predetermined reference value relating to the frequency of the occurrence of errors read out from the auxiliary storage means 93.

If it is determined in step S94 that the current (latest) error occurrence frequency is lower than the predetermined reference value on the error occurrence frequency, which is read out from the auxiliary storage means 93, the retransmission control means 91 in step S95 recognizes that the data communication through the wireless communication between the cellular phone 3 and the headset 7 has currently high quality of communication and currently (lately) low frequency of the occurrence of errors, generates a hands-free mode retransmission control signal for controlling the retransmission in the hands-free mode with low frequency of the occurrence of errors and supplies the hands-free mode retransmission control signal to the response signal processing means 99 of the transmitting/receiving processing means 94.

On the other hand, if it is determined in step S93 that the current (latest) error occurrence frequency is higher than the predetermined reference value on the error occurrence frequency, which is read out from the auxiliary storage means 93, the retransmission control means 91 in step S96 recognizes that the data communication through the wireless communication between the cellular phone 3 and the headset 7 has currently low quality of the communication and currently (lately) high frequency of the occurrence of errors, generates a hands-free mode retransmission control signal for controlling the retransmission in the hands-free mode with the high frequency of occurrence of errors and supplies the hands-free mode retransmission control signal to the response signal processing means 99 of the transmitting/receiving processing means 94.

If it is determined in step S103 that the communication of a given baseband packet has failed, the response signal processing means 99 in step S105 determines whether or not the hands-free mode retransmission control signal supplied from the retransmission control means 91 is a hands-free mode retransmission control signal for controlling the retransmission in hands-free mode with high frequency of occurrence of errors.

If it is determined in step S105 that the hands-free mode retransmission control signal is not a hands-free mode retransmission control signal for controlling the retransmission in hands-free mode with high frequency of the occurrence of errors (that is, if it is determined that the hands-free mode retransmission control signal supplied from the retransmission control means 91 is a hands-free mode retransmission control signal for controlling the retransmission in hands-free mode with low frequency of the occurrence of errors), the response signal processing means 99 in step S106 generates a first retransmission instruction for retransmitting the baseband packet so as to prevent the delay of the data transmission based on the hands-free mode retransmission control signal in hands-free mode with the low frequency of the occurrence of errors and supplies the first retransmission instruction to the packet transmitting/receiving means 98.

Based on the first retransmission instruction supplied from the response signal processing means 99, the packet transmitting/receiving means 98 in step S107 reads out the unsent baseband packet (that is the baseband packet having failed in communication) temporarily stored in the temporary storage means 97 and retransmits the read-out unsent baseband packet (that is a baseband packet having failed in communication) to the headset 7 so as to prevent the delay of the data transmission.

Thus, in the hands-free mode in which the prevention of the delay of data transmission has a higher priority, the packet having failed in communication can be retransmitted with an acceptable realtime level on the playback side when the data communication through the wireless communication between the cellular phone 3 and the headset 7 has the currently high quality of the communication and the currently (lately) low frequency of the occurrence of errors.

On the other hand, if it is determined in step S105 that the hands-free mode retransmission control signal is a hands-free mode retransmission control signal for controlling the retransmission in the hands-free mode with the high frequency of the occurrence of errors, the response signal processing means 99 in step S108 generates second retransmission instructions for retransmitting the baseband packet so as to prevent the loss of data (such as a voice connection request) to be transmitted based on the hands-free mode retransmission control signal in the hands-free mode with the high frequency of the occurrence of errors and supplies the second retransmission instruction to the packet transmitting/receiving means 98.

Based on the second retransmission instructions supplied from the response signal processing means 99, the packet transmitting/receiving means 98 in step S109 reads out the unsent baseband packet (that is the baseband packet having failed in communication) temporarily stored in the temporary storage means 97 and retransmits the read-out unsent baseband packet (that is the baseband packet having failed in communication) to the headset 7 so as to prevent the loss of the data to be transmitted.

Thus, in the hands-free mode in which the prevention of the loss of transmit data has a higher priority, the packet having failed in communication can be retransmitted until the communication succeeds when the data communication through the wireless communication between the cellular phone 3 and the headset 7 has the currently low quality of the communication and the currently (lately) high frequency of the occurrence of errors.

Having described the embodiments of the invention in which the cellular phone 3 is applied as an information processing apparatus according to the present invention, the invention is applicable to not only the cellular phone 3 but also a PDA, a personal computer, a mobile music player and other information processing apparatus. The headset 7 is applied as a player of the present invention. However, according to the present invention, the player is only required to receive and play back the transferred audio data in realtime and may be applicable to an ear-hook hands-free headset, for example, instead of the headset 7.

Furthermore, the series of processing described in the embodiments of the present invention can be executed by not only software but also hardware.

Further, although the steps in the flowchart in the embodiments of the present invention are performed in a time-series manner in the described order, for example, the steps may be performed in parallel or separately, without limiting to the processing to be performed in a time-series manner.

What is claimed is:

1. An information processing apparatus, comprising:
   a transfer control unit configured to control streaming transfer of encoded audio data to a terminal through wireless communication;
   a hands-free control unit configured to control hands-free communication with the terminal through wireless communication, by performing a call control in incoming and outgoing calls between the information processing apparatus and the terminal through wireless communication;
   a transmitting/receiving unit configured to transmit/receive data to/from the terminal; and
   a retransmission control unit configured to control retransmission of data to be transmitted to the terminal by the transmitting/receiving unit so as to prevent delay of data transmission in the streaming transfer of the encoded audio data to the terminal through the wireless communication by the transfer control unit and to control the retransmission of the data so as to prevent loss of the data to be transmitted in control over the hands-free communication with the terminal through the wireless communication by the hands-free control unit; the retransmission control unit controls the retransmission of data so as to prevent delay of data transmission till the information processing apparatus receives an incoming call signal transmitted from another information processing apparatus and controls the retransmission of data so as to prevent loss of the data to be transmitted after the information processing apparatus receives the incoming call signal transmitted from the another information processing apparatus, if the streaming transfer of the encoded audio data to the terminal through the wireless communication by the transfer control unit and the call control in the incoming and outgoing calls between the information processing apparatus and the terminal through the wireless communication by the hands-free control unit are operated in connection.

2. The information processing apparatus according to claim 1, wherein the retransmission control unit stops the streaming transfer of the audio data by the transfer control unit and then controls the retransmission of the data so as to prevent loss of the data to be transmitted in control over the hands-free communication with the terminal through the wireless communication by the hands-free control unit during the streaming transfer of the encoded audio data to the terminal through the wireless communication by the transfer control unit.

3. The information processing apparatus according to claim 1, further comprising:
   an error occurrence frequency managing unit configured to calculate frequency of occurrence of errors in transmitting data to the terminal by the transmitting/receiving unit and managing the calculated frequency of occurrence of errors; and
   a determining unit configured to determine whether or not the frequency of occurrence of errors managed by the error occurrence frequency managing unit is higher than a predetermined reference value,
   wherein, in a case that the determining unit determines that the frequency of occurrence of errors managed by the error occurrence frequency managing unit is higher than the predetermined reference value, the retransmission control unit controls the retransmission of the data so as to prevent loss of data to be transmitted in control over hands-free communication with the terminal through the wireless communication by the hands-free control unit, and in a case that the determining unit determines that the frequency of occurrence of errors managed by the error occurrence frequency managing unit is lower than the predetermined reference value, the retransmission control unit controls the retransmission of data so as to prevent delay of data transmission in control over hands-free communication with the terminal through the wireless communication by the hands-free control unit.

4. The information processing apparatus according to claim 1, wherein the retransmission control unit stops the streaming transfer of the audio data by the transfer control unit and controls the retransmission of data so as to prevent loss of the data to be transmitted if the information processing apparatus receives the incoming call signal transmitted from the another information processing apparatus, in case where the streaming transfer of the encoded audio data to the terminal through the wireless communication by the transfer control unit and the call control in the incoming and outgoing calls between the information processing apparatus and the terminal through the wireless communication by the hands-free control unit are operated in connection.

5. The information processing apparatus according to claim 1, wherein the wireless communication is communication by Bluetooth standard.

6. An information processing apparatus, comprising:
   a transfer control unit configured to control streaming transfer of encoded audio data to a terminal through wireless communication;
   a hands-free control unit configured to control hands-free communication with the terminal through wireless communication, by performing a call control in incoming and outgoing calls between the information processing apparatus and the terminal through wireless communication;
   a transmitting/receiving unit configured to transmit/receive data to/from the terminal;
   an error occurrence frequency managing unit configured to calculate frequency of occurrence of errors in transmitting data to the terminal by the transmitting/receiving unit and managing the calculated frequency of occurrence of errors;
   a determining unit configured to determine whether or not the frequency of occurrence of errors managed by the error occurrence frequency managing unit is higher than a predetermined reference value; and
   a retransmission control unit configured to control retransmission of data to be transmitted to the terminal by the transmitting/receiving unit so as to prevent delay of data transmission in the streaming transfer of the encoded audio data to the terminal through the wireless communication by the transfer control unit and to control the retransmission of the data so as to prevent delay of data transmission or so as to prevent loss of the data to be transmitted, in accordance with a determination result by the determining unit, in control over the hands-free communication with the terminal through the wireless communication by the hands-free control unit, wherein, in case where the streaming transfer of the encoded audio data to the terminal through the wireless communication by the transfer control unit and the call control in the incoming and outgoing calls between the information processing apparatus and the terminal through the wireless communication by the hands-free control unit are operated in connection, the retransmission control unit controls the retransmission of data so as to prevent delay of data transmission till the information processing apparatus receives an incoming call signal transmitted from another information processing apparatus and controls the retransmission of the data so as to prevent loss of data to be transmitted if the determining unit determines that the frequency of occurrence of errors managed by the error occurrence frequency managing unit is higher than the predetermined reference value, and controls the retransmission of data so as to prevent delay of data transmission if the determining unit determines that the frequency of occurrence of errors managed by the error occurrence frequency managing unit is lower than the predetermined reference value after the information processing apparatus receives the incoming call signal transmitted from the another information processing apparatus.

7. The information processing apparatus according to claim 6, wherein the retransmission control unit stops the streaming transfer of the audio data by the transfer control unit and controls the retransmission of data so as to prevent delay of data transmission or so as to prevent loss of the data to be transmitted, in accordance with the determination result by the determination unit, if the information processing apparatus receives the incoming call signal transmitted from the another information processing apparatus, in case where the streaming transfer of the encoded audio data to the terminal through the wireless communication by the transfer control unit and the call control in the incoming and outgoing calls between the information processing apparatus and the terminal through the wireless communication by the hands-free control unit are operated in connection.

8. The information processing apparatus according to claim 6, wherein the wireless communication is communication by Bluetooth standard.

9. An information processing method comprising:
a transfer control step of controlling streaming transfer of encoded audio data to a terminal through wireless communication;
controlling hands-free communication with the terminal through wireless communication, by performing a call control in incoming and outgoing calls between an information processing apparatus and the terminal through wireless communication;
transmitting/receiving data to/from the terminal; and
controlling retransmission of data to be transmitted to the terminal in accordance with processing in the transmitting/receiving step so as to prevent delay of data transmission in the streaming transfer of the encoded audio data to the terminal through the wireless communication in accordance with processing in the transfer control step and controlling the retransmission of the data so as to prevent loss of the data to be transmitted in control over the hands-free communication with the terminal through the wireless communication in accordance with processing in the hands-free control step; the retransmission of data is controlled in accordance with processing in the retransmission control step so as to prevent delay of data transmission till an incoming call signal transmitted from another information processing apparatus is received and the retransmission of data is controlled in accordance with processing in the retransmission control step so as to prevent loss of the data to be transmitted after the incoming call signal transmitted from the another information processing apparatus is received, if the streaming transfer of the encoded audio data to the terminal through the wireless communication in accordance with processing in the transfer control step and the call control in the incoming and outgoing calls between the information processing apparatus and the terminal through the wireless communication in accordance with processing in the hands-free control step are operated in connection.

10. The information processing method according to claim 9, wherein the streaming transfer of the audio data in accordance with processing in the transfer control step is stopped in accordance with processing in the retransmission control step and the retransmission of the data is controlled in accordance with processing in the retransmission control step so as to prevent loss of the data to be transmitted in control over the hands-free communication with the terminal through the wireless communication in accordance with processing in the hands-free control step during the streaming transfer of the encoded audio data to the terminal through the wireless communication in accordance with processing in the transfer control step.

11. The information processing method according to claim 9, further comprising the steps of:
calculating frequency of occurrence of errors in transmitting data to the terminal in accordance with processing in the transmitting/receiving step and managing the calculated frequency of occurrence of errors; and
determining whether or not the calculated frequency of occurrence of errors managed in accordance with processing in the error occurrence frequency managing step is higher than a predetermined reference value,
wherein, in a case that it is determined in accordance with the determining step that the calculated frequency of occurrence of errors is higher than the predetermined reference value, the retransmission of the data is controlled in accordance with processing in the retransmission control step so as to prevent loss of data to be transmitted in control over hands-free communication with the terminal through the wireless communication in accordance with processing in the hands-free control step, and in a case that it is determined in accordance with the determining step that the calculated frequency of occurrence of errors is lower than the predetermined reference value, the retransmission of data is controlled in accordance with processing in the retransmission control step so as to prevent delay of data transmission in control over hands-free communication with the terminal through the wireless communication in accordance with processing in the hands-free control step.

12. The information processing method according to claim 9, wherein the streaming transfer of the audio data in accordance with processing in the transfer control step is stopped in accordance with processing in the retransmission control step and the retransmission of data is controlled in accordance with processing in the retransmission control step so as to prevent loss of the data to be transmitted if the incoming call signal transmitted from the another information processing apparatus is received, in case where the streaming transfer of the encoded audio data to the terminal through the wireless communication in accordance with processing in the transfer control step and the call control in the incoming and outgoing calls between the information processing apparatus and the terminal through the wireless communication in accordance with processing in the hands-free control step are operated in connection.

13. The information processing method according to claim 9, wherein the wireless communication is communication by Bluetooth standard.

* * * * *